United States Patent
Walter et al.

(10) Patent No.: US 9,651,163 B2
(45) Date of Patent: May 16, 2017

(54) COMPONENT FOR A MAGNETIC ACTUATOR AS WELL AS A METHOD FOR ITS MANUFACTURE

(75) Inventors: Rainer Walter, Pleidelsheim (DE);
Johannes Schmid, Immenstadt (DE);
Juergen Graner, Sersheim (DE);
Matthias Schumacher, Weissach (DE);
Andreas Burghardt, Stuttgart (DE);
Ralph Engelberg, Ditzingen (DE);
Jochen Rager, Bisingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 306 days.

(21) Appl. No.: 14/129,182

(22) PCT Filed: May 8, 2012

(86) PCT No.: PCT/EP2012/058437
§ 371 (c)(1),
(2), (4) Date: Mar. 19, 2014

(87) PCT Pub. No.: WO2013/000611
PCT Pub. Date: Jan. 3, 2013

(65) Prior Publication Data
US 2014/0197340 A1    Jul. 17, 2014

(30) Foreign Application Priority Data
Jun. 29, 2011 (DE) .......... 10 2011 078 255
Dec. 14, 2011 (DE) .......... 10 2011 088 463

(51) Int. Cl.
*F16K 31/06* (2006.01)
*F02M 51/06* (2006.01)
*F02M 63/00* (2006.01)

(52) U.S. Cl.
CPC ..... *F16K 31/0675* (2013.01); *F02M 51/0614* (2013.01); *F02M 63/0019* (2013.01);
(Continued)

(58) Field of Classification Search
CPC ............ F16K 31/0675; F02M 63/0019; F02M 51/0614; F02M 2200/8046;
(Continued)

(56) References Cited

U.S. PATENT DOCUMENTS 3,696,837 A * 10/1972 Reip .................. F16K 31/0682
137/625.33
4,585,176 A * 4/1986 Kubach ............. F02M 51/0614
239/585.1
(Continued)

FOREIGN PATENT DOCUMENTS

| CN | 1926326 A | 3/2007 |
|---|---|---|
| DE | 199 24 814 | 12/2000 |

(Continued)

OTHER PUBLICATIONS

Translation of DE 102005052252, Schrade et al., May 2007.*

*Primary Examiner* — John Bastianelli
(74) *Attorney, Agent, or Firm* — Gerard Messina (57) ABSTRACT

A single-piece component for a magnetic actuator, in particular for fuel injection, including an internal pole, a magnetic sleeve, and a non-magnetic separating sleeve, the internal pole, the magnetic sleeve and the separating sleeve being integrated into the single-piece component. A method for manufacturing a single-piece component for an magnetic actuator with the aid of a two-component powder injection molding method.

13 Claims, 5 Drawing Sheets

(52) U.S. Cl.
CPC ............... *F02M 2200/8046* (2013.01); *F02M 2200/9061* (2013.01); *Y10T 137/0491* (2015.04); *Y10T 137/5987* (2015.04)

(58) Field of Classification Search
CPC ...... F02M 2200/9061; Y10T 137/0491; Y10T 137/5987
USPC ................. 251/129.15–129.16, 129.21, 284; 335/281; 137/15.18, 315.03
See application file for complete search history.

(56) References Cited

U.S. PATENT DOCUMENTS

| | | | | |
|---|---|---|---|---|
| 5,207,410 | A * | 5/1993 | Wakeman | F02M 51/005 251/129.15 |
| 5,515,818 | A * | 5/1996 | Born | F01L 9/04 123/90.11 |
| 5,687,468 | A * | 11/1997 | Hans | F02M 51/0614 251/129.21 |
| 5,915,626 | A * | 6/1999 | Awarzamani | F02M 31/125 137/341 |
| 6,157,281 | A * | 12/2000 | Katznelson | G01R 33/3806 324/319 |
| 6,201,461 | B1 * | 3/2001 | Eichendorf | F02M 51/061 251/129.15 |
| 6,322,048 | B1 | 11/2001 | Gramann et al. | |
| 6,702,253 | B2 * | 3/2004 | Noller | F02M 51/0614 251/129.21 |
| 8,757,586 | B2 * | 6/2014 | Gruen | H01F 7/13 251/129.15 |
| 9,401,236 | B2 * | 7/2016 | Maier | B22F 3/225 |
| 2009/0139491 | A1 * | 6/2009 | Joshi | H01F 7/081 123/476 |

FOREIGN PATENT DOCUMENTS

| | | |
|---|---|---|
| DE | 10 2005 052252 | 5/2007 |
| DE | 10 2009 046466 | 5/2011 |
| JP | H06074124 A | 3/1994 |
| JP | 2001148308 A | 5/2001 |
| JP | 2002093618 A | 3/2002 |
| JP | 2002161825 A | 6/2002 |
| JP | 2004323869 A | 11/2004 |
| JP | 2005005652 A | 1/2005 |
| JP | 2005083361 | 3/2005 |
| JP | 2005089777 A | 4/2005 |
| JP | 2005101345 | 4/2005 |
| JP | 2005311248 A | 11/2005 |
| JP | 2007239561 A | 9/2007 |
| JP | 2008157430 | 7/2008 |
| JP | 2011528495 A | 11/2011 |
| WO | WO 2010/012394 A1 * | 2/2010 |
| WO | 2011/076535 | 6/2011 |
| WO | WO 2012/019807 | 2/2012 |

* cited by examiner

COMPONENT FOR A MAGNETIC ACTUATOR AS WELL AS A METHOD FOR ITS MANUFACTURE

FIELD OF THE INVENTION

The present invention relates to a single-piece component, in particular a valve component, and a magnetic actuator, in particular a solenoid valve having a reduced number of components, as well as a method for the simple and cost-effective manufacture of a component.

BACKGROUND INFORMATION

Solenoid valves are known from the related art in various embodiments. In the case of modern injection systems, electromagnetic valves are frequently used, which should have as powerful a magnetic circuit as possible, in order to make it possible in particular to have short switching times and a reproducible opening and closing behavior.

German patent document DE 10 2009 046 466 A1 discusses an injector having a valve-seat carrier, which is manufactured as a single-piece component, and which has a first area of magnetic and a second area of non-magnetic material. This valve-seat carrier may be, for example, manufactured with the aid of an MIM method (metal injection molding). In this case, however, metallic materials are used for both areas. It would be desirable, however, to provide an injector and a method for manufacturing it, which makes a further reduction in manufacturing costs possible.

SUMMARY OF THE INVENTION

The single-piece component according to the present invention having the features described herein has the advantage that a magnetic actuator may be provided having a powerful magnetic circuit, the manufacturing costs of which may be significantly reduced further. Furthermore, a number of components is further reduced as a result of the component according to the present invention. According to the present invention, the powerful magnetic circuit may make it possible to implement short switching times and reproducible opening and closing behavior of a magnetic actuator. According to the present invention, this is achieved by the single-piece component having at least one electromagnetic actuator having an internal pole, a magnetic sleeve and a non-magnetic separating sleeve. In this connection, the internal pole, the magnetic sleeve and the separating sleeve are integrated into a single-piece component. Thus, an integral connection is present between the internal pole, magnetic sleeve and separating sleeve. This further makes it possible to reduce in particular the installation times for the magnetic actuator. Apart from fluid-tightness to the outside, the non-magnetic separating sleeve also ensures that eddy currents are minimized. In particular, a winding situated on an outer side of the separating sleeve may be kept free from fuel, which normally corrodes the components very aggressively.

The further descriptions herein describe refinements of the present invention.

The single-piece component may include a housing, which is additionally integrated into the single-piece component. This makes it possible to reduce the number of components further and achieve even more cost-effective manufacturing.

It particularly may be that the internal pole is subdivided into multiple segments, the individual segments of the internal pole being formed by segmenting areas situated on the separating sleeve made of electrically non-conductive material. This makes it possible in particular to further reduce the undesired formation of eddy currents.

According to another embodiment of the present invention, the housing has a connecting flange projecting axially for a connection of the single-piece component. This makes it possible to connect the single-piece component simply and reliably to other components, for example, to components of an injector.

According to another specific embodiment of the present invention, the internal pole has a radially outwards directed flange having electrically non-conductive segmenting areas. This makes it possible to achieve a further reduction of eddy currents.

It further may be that the non-magnetic separating sleeve has a profiling on its outer circumference for accommodating a winding. As a result, the separating sleeve has an additional function of fixing the winding. The profiling may be formed, for example, by grooves and/or projections. This makes it possible to further integrate a winding carrier for the coil winding into the single-piece component.

The separating sleeve may have a radially outwards directed first wall area on a first end and a radially outwards directed second wall area on a second end. This creates a receiving space for the winding between the two wall areas, so that the winding may be wound rapidly and easily onto the separating sleeve between the wall areas. If necessary, an advantageously slotted sleeve may additionally be pushed over the winding, which may be for covering.

According to an alternative embodiment of the present invention, the internal pole of the single-piece component is situated between the two wall areas on the separating sleeve.

A particularly protected internal pole system may be achieved in this manner. In particular, the magnetic material of the internal pole is protected against corrosive media, such as fuel. This makes it possible to use, for example, pure iron as magnetic material. Furthermore, an outer, axially directed surface of the separating sleeve may be used as a stop surface, for example, a stop of an armature of a solenoid valve.

The present invention also relates to a solenoid valve, in particular an injector, and a method for manufacturing a single-piece component, in particular for a solenoid valve, the single-piece component being manufactured with the aid of a two-component powder injection molding process. Depending on the choice of material, a first MIM (metal injection molding) step is carried out for injection molding a non-magnetic material for manufacturing the separating sleeve, and a second MIM step is carried out for injection molding the other parts, i.e., the internal pole, magnetic sleeve. Alternatively, a CIM (ceramic injection molding) step may be carried out for the injection molding of a ceramic material for manufacturing the separating sleeve and an MIM step may be carried out for manufacturing the other parts of the single-piece component.

The two-component powder injection molding process may be carried out in one step using cores and/or slides or the like, or in multiple steps. After the injection molding step, a chemical and/or thermal debindering and a sintering step may be carried out. Thus, according to the present invention, a very simple and cost-effective method is provided in which a single-piece component including a non-magnetic material, for example, an austenitic steel or a ceramic and a magnetic and/or magnetizable material, for example, pure iron, are provided together in a single-piece valve component. In this connection, an integral connection is formed between the different materials, so that no leakage problems occur in the single-piece component. This makes it possible in particular to ensure leakage tightness against corrosive media, for example, fuel, using simple and cost-effective means. It further may be that a defined cooling takes place after the step of sintering, in which the component has a relatively high temperature, so that desired magnetic properties of the magnetic material are preserved. In particular, integration of the defined cooling into the actual sintering and cooling process makes it possible to dispense with magnetic final annealing of the magnetic material before the defined cooling, which was previously necessary in the related art. This makes it possible to save an additional work step.

The component according to the present invention is used in particular as an injector for the injection of fuel in vehicles.

Exemplary embodiments of the present invention will be explained in detail below with reference to the accompanying drawings.

DETAILED DESCRIPTION

A single-piece component provided as a single-piece valve component 1 will be described in detail below with reference to FIG. 1 according to a first exemplary embodiment of the present invention.

Figure 1:
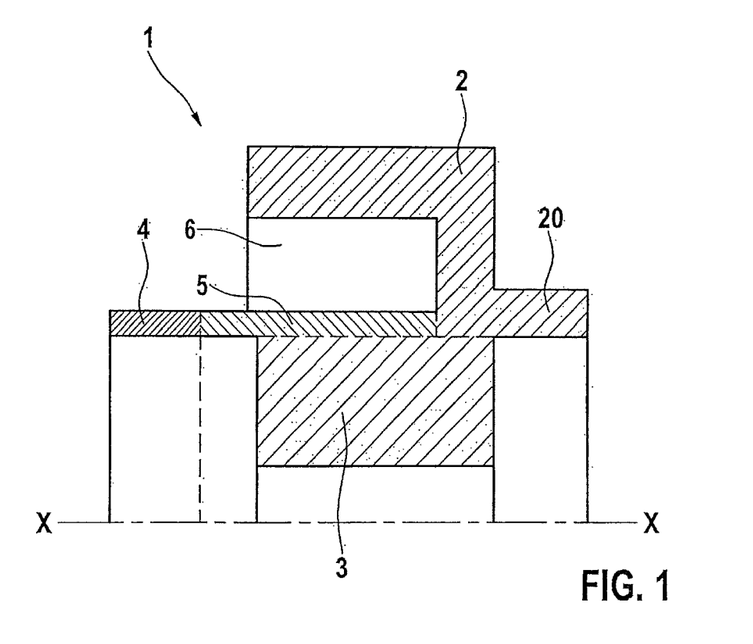
FIG. 1 shows a schematic sectional view of a single-piece component for an injector according to a first exemplary embodiment of the present invention.

As is apparent from FIG. 1, single-piece valve component 1 includes a valve housing 2, which is made of a metallic material, and a cylindrical internal pole 3, which is made of a magnetizable material. Furthermore, single-piece valve component 1 includes a cylindrical magnetic sleeve 4 made of a magnetically conductive material and a cylindrical separating sleeve 5 made of a non-magnetic material such as, for example, an austenitic material or a ceramic. X-X denotes an axial axis of single-piece valve component 1, in the direction of which a needle stroke of a needle, which is not shown, is carried out.

Furthermore, a receiving space 6 is provided between separating sleeve 5 and valve housing 2 for accommodating a winding (not shown). Reference numeral 20 denotes a connecting flange.

Thus, a non-magnetic separating sleeve 5 is integrated in the case of single-piece valve component 1 according to the present invention, an integral connection being provided in each case between the above-described subareas, including valve housing 2, internal pole 3, magnetic sleeve 4 and separating sleeve 5. The single-piece valve component is manufactured by a two-component powder injection molding method. The integration of non-magnetic separating sleeve 5 makes it possible to avoid magnetic losses in the separating sleeve. The magnetic field lines extend between the armature and the internal pole and not across the separating sleeve. This makes it possible to provide a powerful magnetic circuit for a solenoid valve, which is very cost-effective to manufacture. The integration of non-magnetic separating sleeve 5 into single-piece valve component 1 also integrates a function of a magnetic separation into single-piece valve component 1. A magnetic material of internal pole 3 may be configured to have the highest possible saturation induction, in order to optimize the magnetic efficiency. In addition, the single-piece valve component also provides a fuel-tight and high-pressure-tight connection between the individual parts without the necessity of complex connection techniques, such as, for example, welding or the like. The tight connection is achieved by the two-component powder injection molding method.

FIGS. 2 through 8 show alternative embodiments of the present invention, identical or functionally identical parts being denoted by the same reference numerals as in the first exemplary embodiment in each case.

Figure 2:
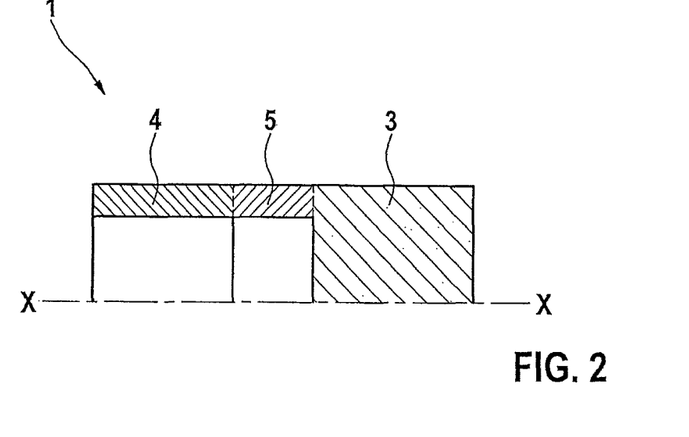
FIG. 2 shows a schematic sectional view of a single-piece component for a magnetic actuator according to a second exemplary embodiment of the present invention.

FIG. 2 shows a second exemplary embodiment of a single-piece component 1, the single-piece component being provided without a housing. Thus, the single-piece component includes only one cylindrical magnetic sleeve 4 made of a magnetically conductive material, one cylindrical, non-magnetic separating sleeve 5 and one cylindrical internal pole 3. As is apparent from FIG. 2, separating sleeve 5 is situated on an end face of internal pole 3, so that single-piece component 1 has a constant external diameter.

Figure 3:
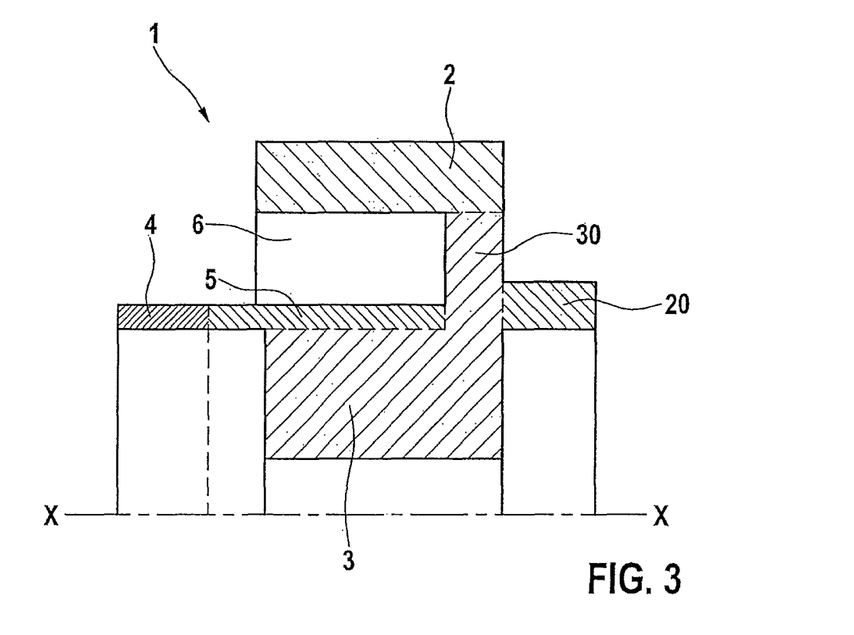
FIG. 3 shows a schematic sectional view of a single-piece component for an injector according to a third exemplary embodiment of the present invention.

FIG. 3 shows a third exemplary embodiment in which internal pole 3 has a radial flange 30 directed outwards, which projects radially outwards from a cylindrical main body of internal pole 3. This radial flange 30 may, if necessary, also be subdivided into segments by providing electrically non-conductive subareas between the individual segments. This embodiment of single-piece component 1 results in a further improvement, i.e., a reduction of eddy currents occurring. In this exemplary embodiment, the valve housing includes two cylindrical subareas 2 and 20.

Figure 4:
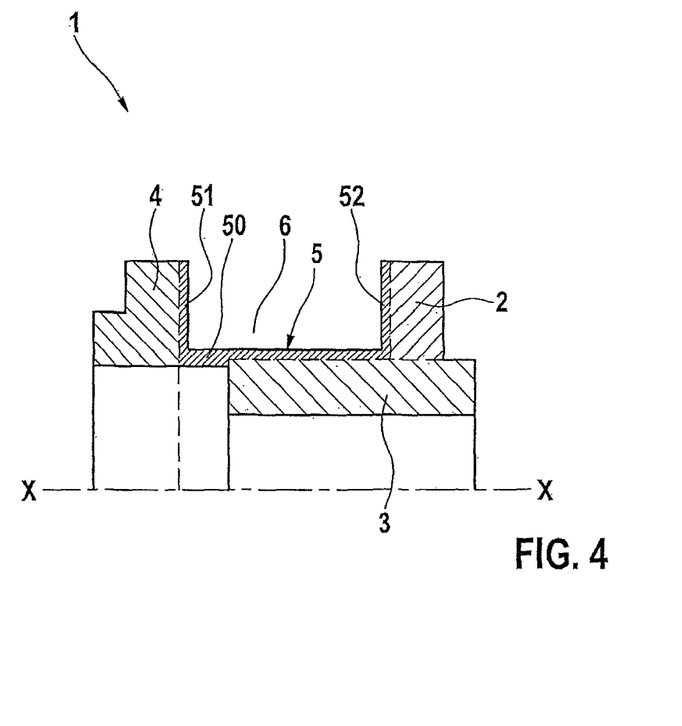
FIG. 4 shows a schematic sectional view of a single-piece component for an injector according to a fourth exemplary embodiment of the present invention.
Figure 5:
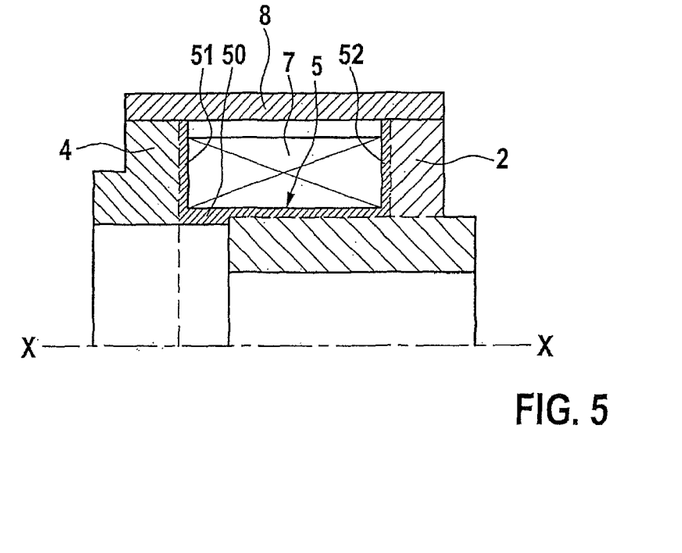
FIG. 5 shows a schematic sectional view of the single-piece component of FIG. 4 having a mounted winding.

FIGS. 4 and 5 show a fourth exemplary embodiment in which non-magnetic separating sleeve 5 has a cylindrical base area and a radially outwards directed first wall portion 51 on a first axial end. Further, separating sleeve 5 has a second radially outwards directed wall area 52 on a second axial end. Thus, a receiving space 6 for accommodating a winding 7 (see FIGS. 4 and 5) is produced in axial direction X-X between the two wall areas 51, 52. After winding 7 has been wound on the outer periphery of separating sleeve 5 between wall areas 51, 52, a cover sleeve 8 will be pushed on, which covers winding 7. A portion of valve housing 2 is formed in one piece with internal pole 3; another portion of the valve housing is provided by separate cover sleeve 8. The cylindrical internal pole is situated radially within separating sleeve 5.

Figure 6:
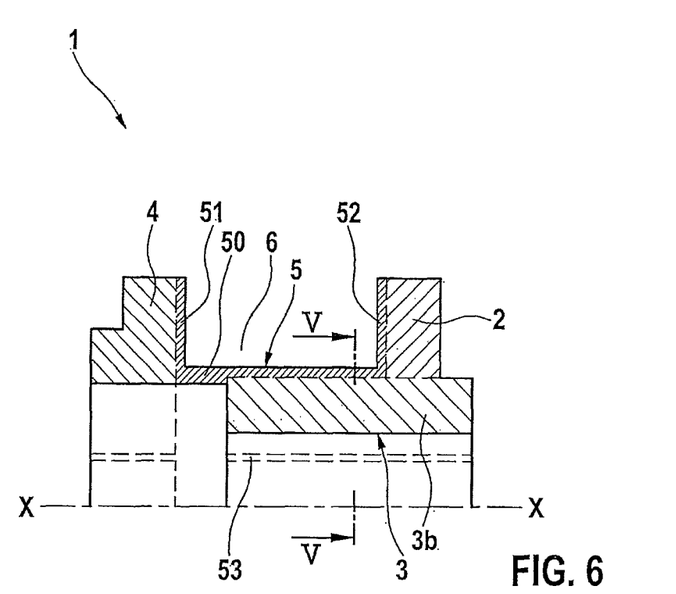
FIG. 6 shows a schematic sectional view of a single-piece component for an injector according to a fifth exemplary embodiment of the present invention.
Figure 7:
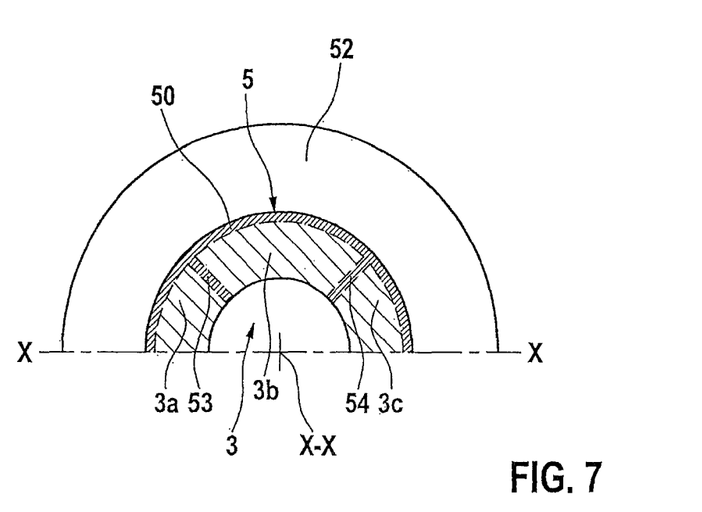
FIG. 7 shows a schematic sectional view of the single-piece component of FIG. 6 along Line V-V.

The fifth exemplary embodiment shown in FIGS. 6 and 7 is substantially similar to the fourth exemplary embodiment, a plurality of segmenting areas 53, 54, which are made of electrically non-conductive material, being additionally provided in cylindrical internal pole 3. Segmenting areas 53, 54 are provided as wall areas extending in axial direction X-X, which are formed in one piece extending radially inwards on the inner circumference of separating sleeve 5. This causes internal pole 3 to be subdivided into multiple segments 3a, 3b, 3c, which makes it possible to minimize the generation of eddy currents during operation. In this way, a more powerful magnetic circuit is obtained.

Figure 8:
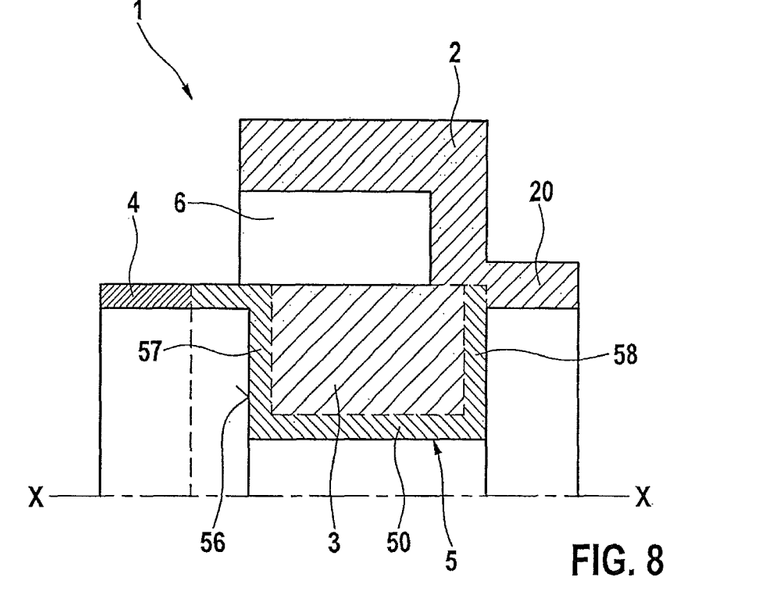
FIG. 8 shows a schematic sectional view of a single-piece component for an injector according to a sixth exemplary embodiment of the present invention.

FIG. 8 shows a sixth exemplary embodiment of a single-piece component 1, separating sleeve 5, which is made of a non-magnetic material, having a radially outwards directed first wall area 57 and a second wall area 58. In the sixth exemplary embodiment, however, internal pole 3 is accommodated in the space formed in the axial direction between the two wall areas 57, 58 and situated radially outside of base area 50. As is apparent from FIG. 8, internal pole 3 is thus enclosed on three sides by separating sleeve 5. Between a radial outer side of internal pole 3 and valve housing 2, receiving space 6 is in turn provided for accommodating the winding, which is not shown. Thus, in addition to the function of magnetic separation, separating sleeve 5 additionally provides protection against corrosive media, such as, for example, fuel for internal pole 3. This makes it possible for the magnetic material for internal pole 3 to be configured to have maximum saturation induction. Depending on the choice of material for separating sleeve 5, a stop surface 56 for a valve needle and a component connected to the valve needle may additionally be provided. This in particular makes it possible to dispense with a separate component for a stop for the valve needle. The use of this specific embodiment of single-piece component 1 makes it possible in particular to implement a very compact configuration for the injector.

Figure 9:
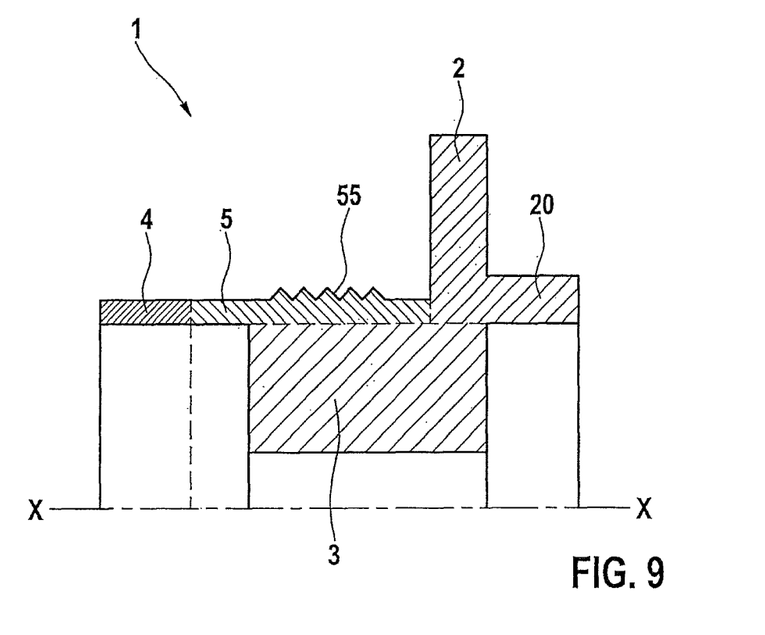
FIG. 9 shows a schematic sectional view of a single-piece component for an injector according to a seventh exemplary embodiment of the present invention.

FIG. 9 shows a seventh exemplary embodiment of the present invention, which has a separating sleeve 5 made of non-magnetic material, on the outer circumference of which a profiling 55 is formed. Profiling 55 includes a plurality of annular grooves and projections for accommodating a winding (not shown). Thus, a winding carrier is additionally integrated into non-magnetic separating sleeve 5, making it possible to further reduce the number of parts for the injector by integrating the winding carrier. It should be noted that such an integrated winding carrier may also be provided in the other described exemplary embodiments, except for the sixth exemplary embodiment.

For all exemplary embodiments described, it should be noted that they may be configured to have either a single-piece internal pole 3, or an internal pole subdivided into multiple segments.

It should also be noted that all described exemplary embodiments may also be used as magnetic actuators in other technical fields instead of in solenoid valves.

What is claimed is:

1. A method for manufacturing a solenoid valve structure, the method comprising:
    performing a two-component powder injection molding operation, which includes performing the following, either simultaneously or in any sequence, to form a single-piece component that includes an internal pole, a magnetic sleeve, and a non-magnetic separating sleeve:
        injection molding a non-magnetic material; and
        injection molding a magnetic material; and
    attaching a winding to the single-piece component;
    wherein:
        a plurality of axial coordinates are shared by both (a) a position of at least a portion of the internal pole and (b) a position of at least a portion of the winding; and
        the non-magnetic separating sleeve separates the internal pole from the magnetic sleeve and radially separates the internal pole from the winding at all of the plurality of axial coordinates shared by the positions of the at least the portion of the internal pole and the at least the portion of the winding.

2. An arrangement for a magnetic actuator, which is part of a solenoid valve, the arrangement comprising:
    a winding; and
    a single-piece component in which are integrated:
        an internal pole, wherein a plurality of axial coordinates are shared by both (a) a position of at least a portion of the internal pole and (b) a position of at least a portion of the winding;
        a magnetic sleeve; and
        a non-magnetic separating sleeve that separates the magnetic sleeve from the internal pole and that radially separates the internal pole from the winding at all of the plurality of axial coordinates shared by the positions of the at least the portion of the internal pole and the at least the portion of the winding.

3. The arrangement of claim 2, further comprising:
    a housing, which is additionally integrated into the single-piece component.

4. The arrangement of claim 3, wherein the housing has a connecting flange for a connection of the single-piece component.

5. The arrangement of claim 2, wherein the internal pole has a radial flange directed radially outwards.

6. The arrangement of claim 2, wherein the separating sleeve has a radially outwards directed first wall area on a first axial end and a radially outwards directed second wall area on a second axial end.

7. The arrangement of claim 6, further comprising:
    a winding, which is situated in a receiving space formed between the first and the second wall areas.

8. The arrangement of claim 2, further comprising:
    a metal housing that is integrated into the single-piece component and that includes a base region and a connecting flange, wherein:
        in a radial direction, the connecting flange is more interior than the base region;
        the connecting flange is directly connected to the inner pole; and
        at least a portion of the winding is arranged radially between the separating sleeve and the base region of the metal housing.

9. A single-piece component for a magnetic actuator, which is part of a solenoid valve, the single-piece component comprising, integrated with each other:
    an internal pole;
    a magnetic sleeve; and
    a non-magnetic separating sleeve that separates the magnetic sleeve from the internal pole and that includes:
        a circumferential wall that, in a radial direction, is positioned immediately adjacent to the internal pole; and
        a plurality of separating walls that each extends radially from the circumferential wall into the internal pole, the separating walls thereby dividing the internal pole into a plurality of segments with respect to a circumferential direction.

10. An arrangement for a magnetic actuator, which is part of a solenoid valve, the arrangement comprising:
- a winding; and
- a single-piece component in which are integrated:
  - an internal pole;
  - a magnetic sleeve; and
  - a non-magnetic separating sleeve that:
    - separates the internal pole from the magnetic sleeve;
    - radially separates the internal pole from the winding; and
    - has a profiling formed of a series of annular grooves separated axially by respective annular projections for accommodating a winding.

11. A single-piece component for a magnetic actuator, which is part of a solenoid valve, the single-piece component comprising the following integrated with each other:
- a magnetic sleeve;
- a non-magnetic separating sleeve that has a radially outwards directed first wall area on a first axial end and a radially outwards directed second wall area on a second axial end; and
- an internal pole that is situated between the first wall area and the second wall area and is separated from the magnetic sleeve by the non-magnetic separating sleeve.

12. The component of claim 11, wherein one of the wall areas of the separating sleeve forms a stop for a valve needle or a component connected to the valve needle.

13. A solenoid valve, comprising:
- a magnetic actuator, which is an injector for fuel injection, the magnetic actuator including:
  - a winding; and
  - a single-piece component in which are integrated:
    - an internal pole, wherein a plurality of axial coordinates are shared by both (a) a position of at least a portion of the internal pole and (b) a position of at least a portion of the winding;
    - a magnetic sleeve; and
    - a non-magnetic separating sleeve that separates the internal pole from the magnetic sleeve and that radially separates the internal pole from the winding at all of the plurality of axial coordinates shared by the positions of the at least the portion of the internal pole and the at least the portion of the winding.

* * * * *